United States Patent [19]

Watanabe et al.

[11] Patent Number: 5,553,428
[45] Date of Patent: Sep. 10, 1996

[54] MOLDING FOR A FRONT GLASS

[75] Inventors: Koji Watanabe; Toru Sugita; Yasutomo Kobayashi; Masaharu Shibao; Akimitsu Mita, all of Yokohama, Japan

[73] Assignee: Nifco Inc., Japan

[21] Appl. No.: 143,781

[22] Filed: Nov. 1, 1993

[30] Foreign Application Priority Data

Nov. 4, 1992 [JP] Japan .................................. 4-295137

[51] Int. Cl.⁶ .................. E06B 3/62; B60J 10/00
[52] U.S. Cl. ............... 52/208; 52/204.591; 296/93; 296/201; 296/208; 296/154
[58] Field of Search ............... 52/208, 204.591, 52/204.597, 204.62, 716.5; 296/93, 201, 208, 154

[56] References Cited

U.S. PATENT DOCUMENTS

| 4,757,659 | 7/1988 | Miykawa et al. | 52/204.597 |
|---|---|---|---|
| 4,884,380 | 12/1989 | Yada et al. | 52/204.597 X |
| 4,890,431 | 1/1990 | Katayama | 52/208 |
| 5,035,459 | 7/1991 | Yada | 296/93 |
| 5,078,444 | 1/1992 | Shirahata et al. | 52/204.597 X |
| 5,190,338 | 3/1993 | Yada | 52/208 X |
| 5,193,876 | 3/1993 | Yada et al. | 296/93 |
| 5,233,805 | 8/1993 | Hirai et al. | 52/208 X |
| 5,344,205 | 9/1994 | Yada et al. | 52/204.597 X |
| 5,374,,096 | 12/1994 | Yada | 52/204.597 X |

FOREIGN PATENT DOCUMENTS 4-218427  8/1992  Japan ...................... 296/201

*Primary Examiner*—Robert J. Canfield
*Attorney, Agent, or Firm*—Parkhurst, Wendel & Burr

[57] ABSTRACT

A molding for mounting in a gap between an outer periphery and a window frame of an automobile is disclosed. The molding is formed of a length of material having first and second pillar sections extending into corner sections, the corner sections being interconnected via a roof section. A cross-section of the molding includes a leg portion and a head portion extending therefrom, the head portion having a parasol-shape and overhanging the leg portion. A glass lip projects from a first side of the leg portion, the molding being configured to receive an outer periphery of the front glass between the glass lip and a lower surface of the head portion. Additionally, a panel lip projects from a second side of the leg portion, the panel lip being adapted to elastically abut and engage the window frame of the automobile. Further, a groove lip extends over a length of each of the pillar portions, and projects from the upper surface of the head portion. The groove lip is formed of a material different from the other components of the molding, but is integrally extruded with the other components.

13 Claims, 13 Drawing Sheets

MOLDING FOR A FRONT GLASS

BACKGROUND OF THE INVENTION

1. Field of the Invention

The present invention relates to a molding for a front glass which closes a gap between a peripheral portion of a window glass of a vehicle, particularly an automobile, and a window frame of the vehicle body.

2. Related Art

In general, as shown in FIG. 14, in a molding 80 which closes a gap between a peripheral portion of a front glass 12 and the window frame 14 of the vehicle body, there is formed a rain gutter G (see FIG. 15) so that rainwater wiped away by a wiper 82 does not flow along the sides of the vehicle.

As shown in FIG. 15, a lip 84 forming the rain gutter G gradually becomes smaller from the lower portion to the upper portion of a front pillar portion 30 so as to improve the aerodynamic characteristics when the vehicle travels. Further, at a roof portion 32, the molding structure has no lip 84.

Conventionally, methods described below have been used in practice methods to mount the molding 80, which has configurational characteristics such as those described above, between the peripheral portion of the front glass 12 and the window frame 14 of the body.

In the first method, the molding 80 is divided into three parts 80A, 80B and 80C, corresponding respectively to a portion of the molding 80 which is disposed at the front pillar portion 30, a portion disposed at the corner portion between the front pillar portion 30 and the roof portion and a portion disposed at the roof portion 32. The three parts, 80A, 80B and 80C are molded separately in the factory and are fitted to each other.

In the above method, however, the amount of labor required for assembly increases in accordance with the increase in the number of parts. Further, since there are seams, the appearance is not attractive.

In the second method, which attempts to compensate for this drawback, as shown in FIG. 16, a molding 80 having a uniform cross-section is extrusion-molded, and an unnecessary portion (the region shown by the broken line) is cut in accordance with a region to which the molding 80 is to be mounted.

However, since two processes, extrusion-molding and cutting, are necessary, the production cost of the molding 80 is increased. Further, if cutting is carried out by using a cutter, it becomes difficult to form an R portion in the cutting surface, and the appearance is poor as the luster is different.

Therefore, to solve the drawbacks of the first and second methods, there has been developed a method in which a molding having different cross-sections at different parts thereof is produced so as to be continuous by enlarging and reducing the die hole of a molding die of an extrusion-molding apparatus (Japanese Patent Application Laid-Open No. 3-143730).

However, since the entire molding produced by this method is formed of the same material, changes in pressure may occur, at portions where the cross-sections vary, due to the variations in the cross-sections, and the entire cross-sectional configuration of the molding may deform. Further, if the lip which protrudes from the upper surface of the molding and forms the rain gutter is hard, a drawback results with respect to safety in that an R portion having more than a certain curvature is not provided at the tip end portion of the lip. Therefore, high accuracy is required for molding.

Further, in the conventional molding, no consideration has been given to prevent the occurrence of abnormal sounds at the surface of the molding which contacts the front glass, nor to increasing the adhesion of the molding to the front glass.

Moreover, as shown in FIG. 17, in an insertion section L1 of the molding 80 which is inserted into the lower portion of the front pillar section, the lip 84 forming the rain gutter is cut by a cutter after extrusion-molding. However, since it is difficult to form an R portion in the cutting surface and because the luster is different, the appearance in the vicinity of the lower portion of the front pillar deteriorates.

SUMMARY OF THE INVENTION

In view of the foregoing facts, an object of the present invention is to provide a molding for a front glass which has a good appearance at the lower portion of the front pillar, whose entire cross-sectional configuration does not deform during molding at regions at which cross-sections vary, and in which abnormal sounds are not generated at a contacting surface of the molding which adheres well to the front glass.

The molding for the front glass of the first aspect of the present invention is mounted in a gap between a peripheral portion of a front glass of a vehicle and a window frame of a body of the vehicle, and includes a section of material including first and second pillar sections extending into corner sections that are interconnected via a roof section. A cross-section of the molding includes a leg portion inserted into the gap; a head portion over-hanging from an upper end of the leg portion and covering an opening of said gap; a glass lip which projects from a side surface of the leg portion such that the peripheral portion of the front glass is interposed between a lower surface of the head portion and the glass lip; a panel lip which projects from the side surface of the leg portion, and which elastically abuts and engages the window frame of the vehicle body; and a groove lip which is formed of a material which is different than a material of the leg portion, the head portion, the glass lip and the panel lip, the groove lip extending over a predetermined length along the pillar sections and extending from a top surface of the head portion so as to cover an upper surface of the front glass, and an extended length of the groove lip becoming gradually shorter and disappearing at a corner section, which is between the upper section of the front pillar section and the roof portion, wherein the leg portion, the head portion, the glass lip, the panel lip and the groove lip are integrally extrusion-molded.

Further, a portion of the groove lip along the lower portion of the front pillar section may be eliminated during extrusion-molding (i.e., the height of the groove lip may be decreased along the lower portion of the front pillar section).

The molding for the front glass of the second aspect of the present invention is mounted in a gap between a peripheral portion of a front glass of a vehicle and a window frame of a body of the vehicle, and includes a section of material including first and second pillar sections extending into corner sections that are interconnected via a roof section. A cross-section of the molding includes a leg portion inserted into said gap; a head portion overhanging from an upper end of the leg portion and covering an opening of the gap; a glass lip which projects from a side surface of the leg portion and supports the peripheral portion of the front glass; a panel lip which projects from the side surface of the leg portion, and which elastically abuts and engages the window frame of the vehicle body; and a groove lip formed of a material which is different than a material of the leg portion, the head portion, the glass lip and the panel lip, the groove-lip extending over predetermined length along the pillar sections and extending from a lower surface of the head portion so that a tip portion of the groove lip abuts a surface of said front glass, and an extended length of the groove lip becoming gradually shorter and disappearing at a corner section, which is between the upper portion of the front pillar section and the roof section; wherein the leg portion, the head portion, the glass lip, the panel lip and the groove lip are integrally extrusion-molded.

The molding for the front glass of the third aspect of the present invention is mounted in a gap between a peripheral portion of a front glass of a vehicle and a window frame of a body of the vehicle, and includes a section of material including first and second pillar sections extending into corner portions that are interconnected via a roof section. A cross-section of the molding includes a leg portion inserted into the gap, a length of insertion of the leg portion from a lower portion to an upper portion of the front pillar section being constant, and the length of insertion becoming gradually shorter and disappearing at a corner section, which is between the upper portion of the front pillar section and the roof section, and the length of insertion being a constant length at the roof section, and a varying portion of the length of insertion being formed of a material which is different than a material of other portions; a head portion overhanging from an upper end of the leg portion and covering the opening of the gap; a glass lip which projects from a side surface of a lower end portion of the leg portion and supports the peripheral portion of the front glass; a pair of a panel lips which project from the side surface of the leg portion, and which elastically abut and engage the window frame of the vehicle body: and a groove lip which is formed of a material which is different than a material of the leg portion, the head portion, the glass lip and the panel lip, the groove lip extending from a lower surface of the head portion so that a tip portion of the groove lip abuts a surface of the front glass such that the peripheral portion of the front glass is interposed between the glass lip and the groove lip, and an extended length of the groove lip becoming gradually shorter and disappearing at a corner section, which is between the upper portion of the front pillar section and the roof section; wherein the leg portion, the head portion, the glass lip, the panel lip and the groove lip are integrally extrusion-molded.

The molding for a front glass according to the first aspect is continuous and is integrally molded so as to extend over the entire periphery of the front glass by the enlargement and reduction of the die hole of the molding die of the extrusion-molding apparatus. The leg portion of the molding is inserted into the gap between the peripheral portion of the front glass and the window frame of the body. The head portion covers the opening of the gap, and the peripheral portion of the front glass is interposed between the head portion and the glass lip. The panel lip elastically abuts and engages the window frame of the vehicle body.

At the top surface of the head portion of the molding, a groove lip extends so as to cover the upper surface of the front glass and forms a rain gutter. The rainwater wiped away by a wiper is thereby prevented from flowing along the sides of the vehicle.

The extended length of the groove lip which forms the rain gutter gradually becomes shorter and disappears at a corner section, which is between the upper portion of the front pillar section and the roof section, and at the roof section. Therefore, aerodynamic resistance while the vehicle is traveling can be reduced, and a sound of cutting the wind is not generated.

Further, the groove lip is integrally molded with the leg portion, the head portion, the glass lip and the panel lip, and is formed of a different material than these portions. That is, since portions in which the cross-sections vary are formed of different materials, transmission of pressure changes to portions other than those in which the cross-sections are intended to vary is prevented. Therefore, undesirable changes in the configuration of the molding are prevented. Further, because the groove lip is formed of a soft material, there is no need to provide an R portion having more than a certain curvature at the tip thereof in order to ensure safety, and high precision is not required for molding.

Moreover, if the portion of the groove lip along the lower portion of the front pillar section is eliminated during extrusion-molding, the R portion can be easily formed in the surface which remains after the portion is eliminated. Further, because the luster is the same, the appearance in the vicinity of the lower portion of the front pillar is improved.

In the molding for a front glass according to the second aspect, the tip of the groove lip extending from the lower surface of the head portion towards the front glass surface abuts the front glass surface so as to form rain gutter. By molding the groove lip integrally with the leg portion, the head portion, the glass lip and the panel lip and forming the groove lip with a different material, transmission of changes in pressure to portions other than those in which the cross-sections vary is prevented. Therefore, deformation of the entire cross-sectional configuration is prevented. Further, the adhesion of the molding and the front glass is high, and abnormal sounds are not generated at the contacting surface. Moreover, the leg section of the molding is to be cut at the roof portion, but because the cut portion does not appear on the outer surface, the appearance does not deteriorate. Since only the cross-section of the die hole of the groove lip is changed, the extrusion speed during molding can be kept constant, and other constituent portions are not adversely effected.

In the molding for the front glass according to the third aspect, the length of insertion of the leg portion gradually becomes shorter at a corner section, which is between the upper portion of the front pillar section and the roof section. In order to maintain a certain length at the roof section, the varying portion of the length of insertion is integrally molded with other portions and is formed of a material which is different than that of the other portions. Therefore, since the amount which is held between the glass lip which supports the peripheral portion of the front glass and the groove lip does not change, the adhesion of the molding and the front glass can be increased.

As the present invention is structured as described above, the entire cross-sectional configuration does not change at portions in which the cross-sections are varied due to extrusion-molding. Further, soft materials contact the front glass to keep the held amount constant, whereby the adhesion of the molding and the front glass is high and abnormal sounds are not generated at the contacting surface. Further, because the molding is formed such that unnecessary portions at the portion to be inserted into the cowl top are eliminated in advance, the appearance of the lower portion of the front glass is improved.

DESCRIPTION OF THE PREFERRED EMBODIMENTS

Figure 1:
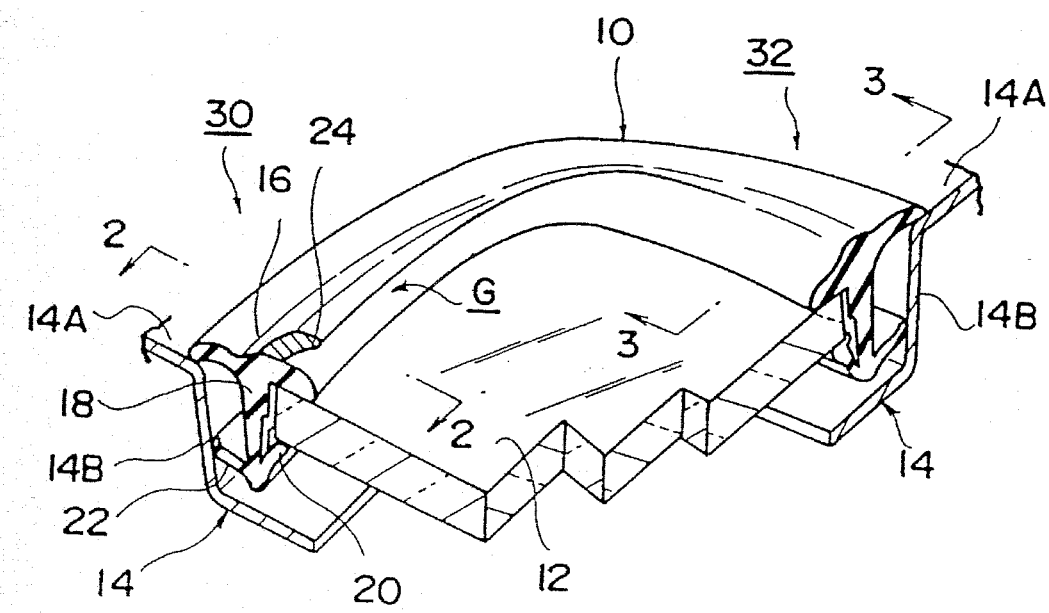
FIG. 1 is a perspective view illustrating a mounted state of a molding according to a first embodiment of the present invention.
Figure 2:
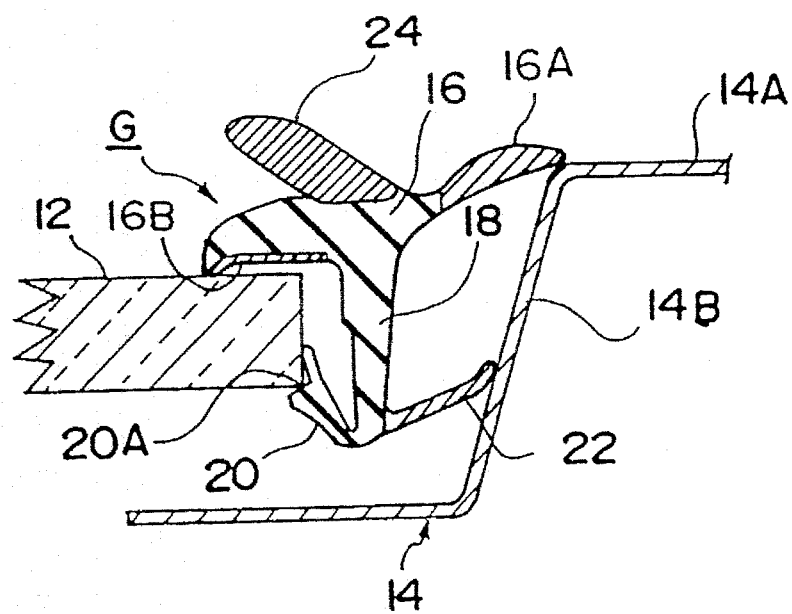
FIG. 2 is a sectional view along line 2—2 in FIG. 1.

Referring to FIGS. 1 to 5, there are shown states in which a molding 10 according to a first embodiment is mounted to a gap between a peripheral portion of a front glass 12 and a window frame 14 of a vehicle body.

A head portion 16 of the molding 10 has a parasol-shaped cross-section, and extends to both sides from the upper end of a leg portion 18 (formed of vinyl chloride having a Shore hardness of 95) which is inserted into the gap between the peripheral portion of the front glass 12 and the window frame 14 of the vehicle body. A lower surface 16B of an inside lip shown by oblique lines (formed of a chlorinated ethylene copolymer crosslinked alloy having a Shore hardness of 70) abuts the upper surface of the peripheral portion of the front glass 12. An outside lip 16A shown by oblique lines (formed of a chlorinated ethylene copolymer crosslinked alloy having a Shore hardness of 70) is elastically supported on an upper surface 14A of the window frame 14 of the vehicle body.

Further, at the lower end of the leg portion 18, a glass lip 20 is provided so as to project diagonally upwards. At the tip of the glass lip 20, a step portion 20A is formed such that the peripheral portion of the front glass 12 is interposed between the lower surface of the head portion 16 and the step portion 20A. A panel lip 22 (formed of a chlorinated ethylene copolymer crosslinked alloy having a Shore hardness of 70) is provided so as to project from the leg portion 18 towards the window frame 14, and to abut and engage an upright surface 14B of the window frame 14.

Further, at the top surface of the head portion 16, there is formed a groove lip 24 (formed of vinyl chloride having a Shore hardness of 80) which is indicated by the crossed lines. The groove lip 24 is integrally molded with the leg portion 18, the head portion 16, the glass lip 20 and the panel lip 22, but is formed of a different material. The groove lip 24 extends so as to cover the upper surface of the front glass 12. As shown in the unfolded view of FIG. 5, the groove lip 24 is eliminated at an insertion section L1 which extends along the lower portion of a front pillar portion 30 (i.e., the height of groove lip 24 is decreased along the insertion section L1, inserted into the cowl top or the fender). The groove lip 24 extends for a certain length from the lower portion of the front pillar portion 30 to the upper portion of the front pillar portion 30 (pillar section L2). The length of extension of the groove lip 24 is gradually shortened over a corner portion (corner section L3), which is between the upper portion of the front pillar portion 30 and a roof portion 32, and the groove lip 24 is eliminated at the roof portion 32 (roof section L4).

Figure 3:
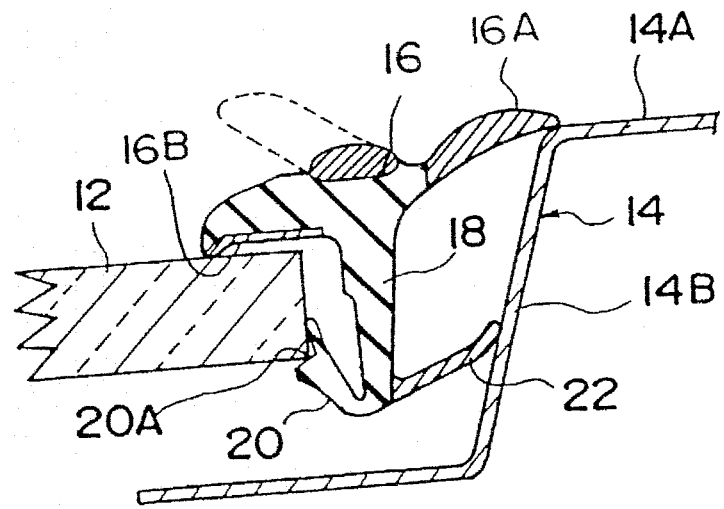
FIG. 3 is a sectional view along line 3—3 in FIG. 1.
Figure 4:
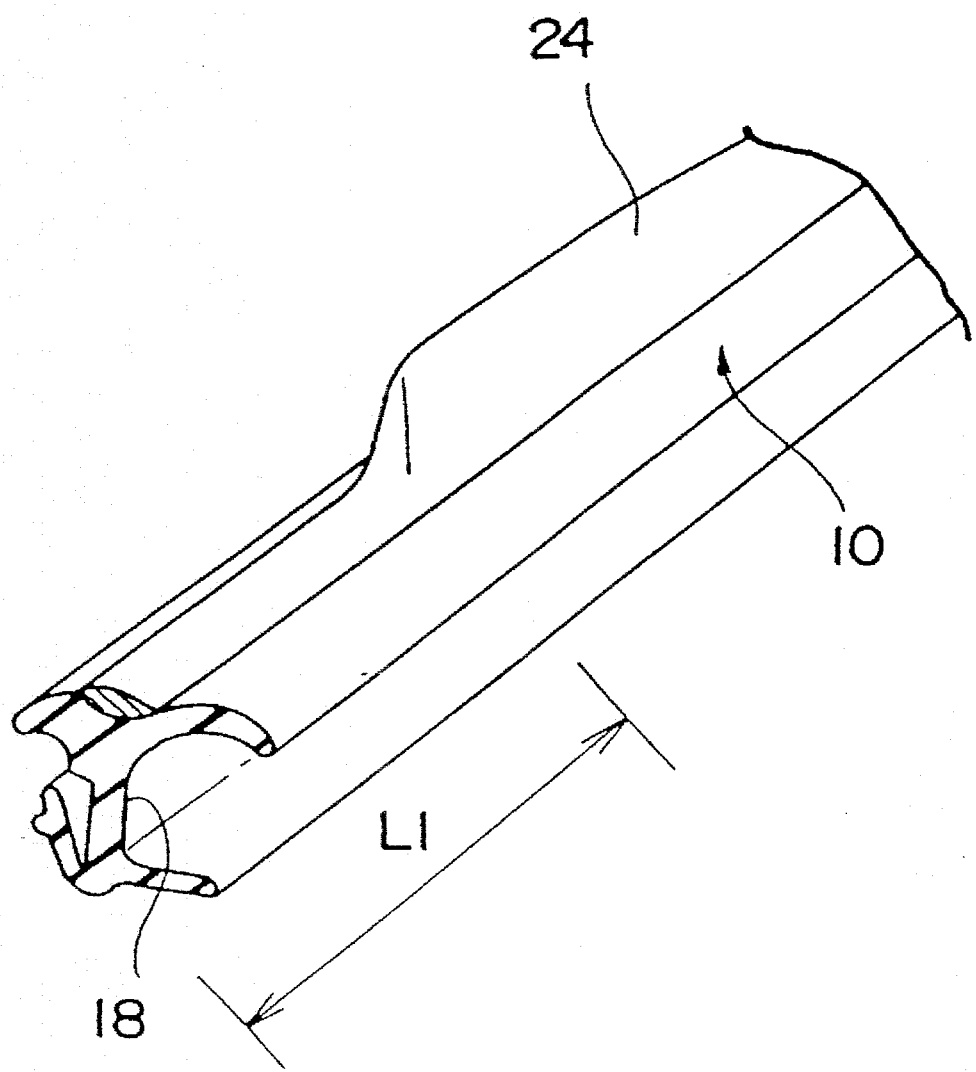
FIG. 4 is a perspective view illustrating an insertion portion of the molding according to the first embodiment of the present invention.

The groove lip 24 forms a so-called rain gutter so as to prevent rainwater wiped away by a wiper from flowing along the sides of the vehicle. As shown in FIGS. 1 and 3, the groove lip 24 is eliminated at the roof portion 32. Therefore, the aerodynamic characteristics when the vehicle travels is improved, and sounds due to cutting the wind are not generated.

Figure 5:
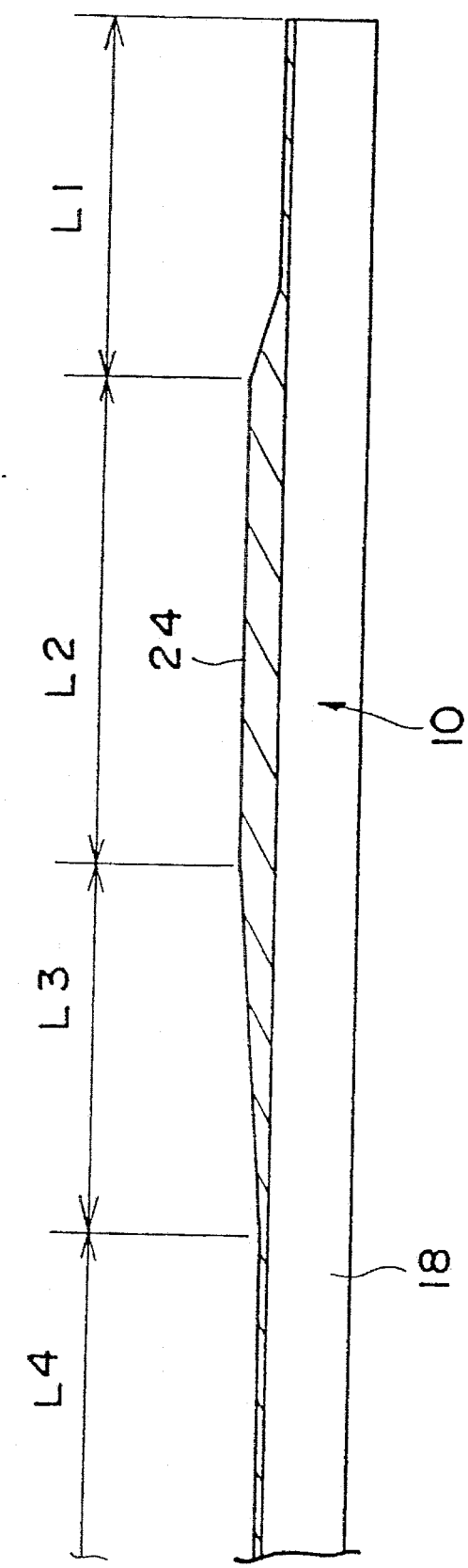
FIG. 5 is a partially unfolded view of the molding according to the first embodiment of the present invention.
Figure 6:
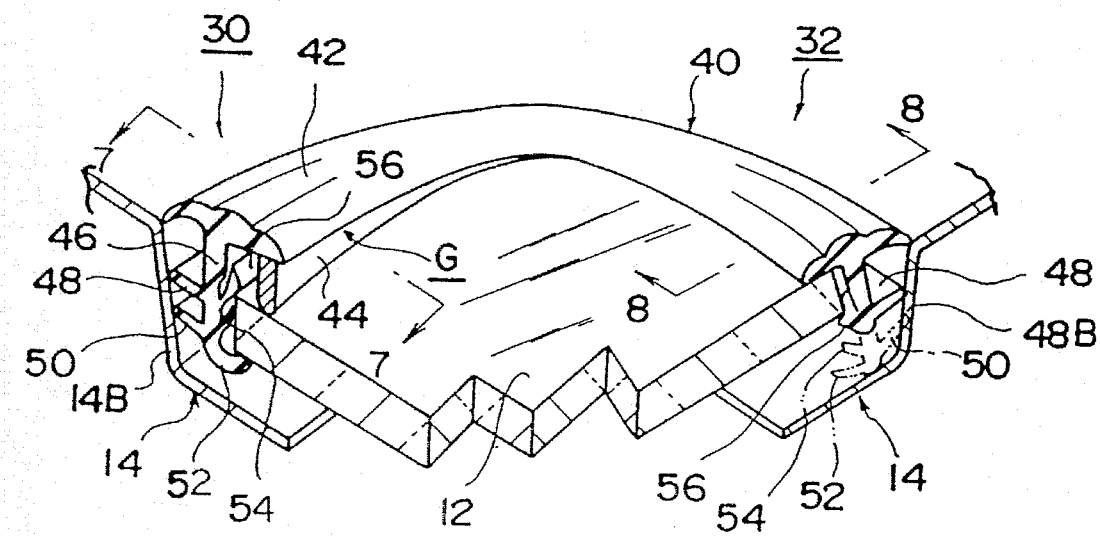
FIG. 6 is a perspective view illustrating a mounted state of a molding according to a second embodiment of the present invention.

The molding 10 formed by the leg portion 18, the head portion 16, the glass lip 20, the panel lip 22 and the groove lip 24 is integrally molded in various colors, and as shown in FIG. 5, the length of an inner periphery of the window frame 14 receives the molding 10 (in FIG. 5, only one side of the molding is shown). By enlargement and reduction of the die hole of the molding die of the extrusion-molding apparatus, the molding 10 is integrally molded so as to be continuous while the groove lip 24 made of a different material gradually varies from the insertion section L1 inserted into the lower portion of the front pillar portion 30 (L1 is the section inserted to the cowl top or the fender) and over the corner portion (corner section L3) which is between the lower portion of the front pillar portion 30 and the roof portion 32. Thus, by forming the groove lip 24 of a different material, transmission of pressure change to portions other than the portion whose cross-section is intended to be changed is prevented. Therefore, undesirable deformation in the entire cross-sectional configuration is prevented. Further, because the groove lip 24 is formed of a soft material, there is no need to provide an R portion having more than a certain curvature at the tip portion thereof in order to ensure safety. Therefore, high precision is not required for molding. Moreover, since unnecessary portions are eliminated during extrusion-molding, an R portion can be easily formed in a surface remaining after the unnecessary portions are eliminated. Since the luster is the same, the appearance can be improved. Moreover, as the outside lip 16A and the lower surface 16B of the inside lip are made of soft materials having a Shore hardness of 70, the adhesion thereof to the body is high.

Although not shown in drawings, the front glass 12 is fixed to the window frame 14 by an adhesive.

The molding according to the second embodiment will now be described.

A molding 40 of the second embodiment is formed by multicolor integral molding. As shown in FIGS. 6 to 9, a groove lip 44 (formed of a chlorinated ethylene copolymer crosslinked alloy having a Shore hardness of 80), which is indicated by oblique lines, is made of a soft material and extends from the lower surface of a head portion 42 towards the front glass 12. A tip end of the groove lip 44 abuts against the front glass 12 so as to form a rain gutter G. Therefore, the adhesion with the front glass 12 is high, and abnormal sounds are not generated at the surface of the groove lip 44 which contacts the front glass 12. An outside lip 42A, illustrated by oblique lines, is formed of a chlorinated ethylene copolymer crosslinked alloy having a Shore hardness of 70 so as to increase the adhesion with the body. Moreover, bright tape T is attached to the head portion 42.

Figure 7:
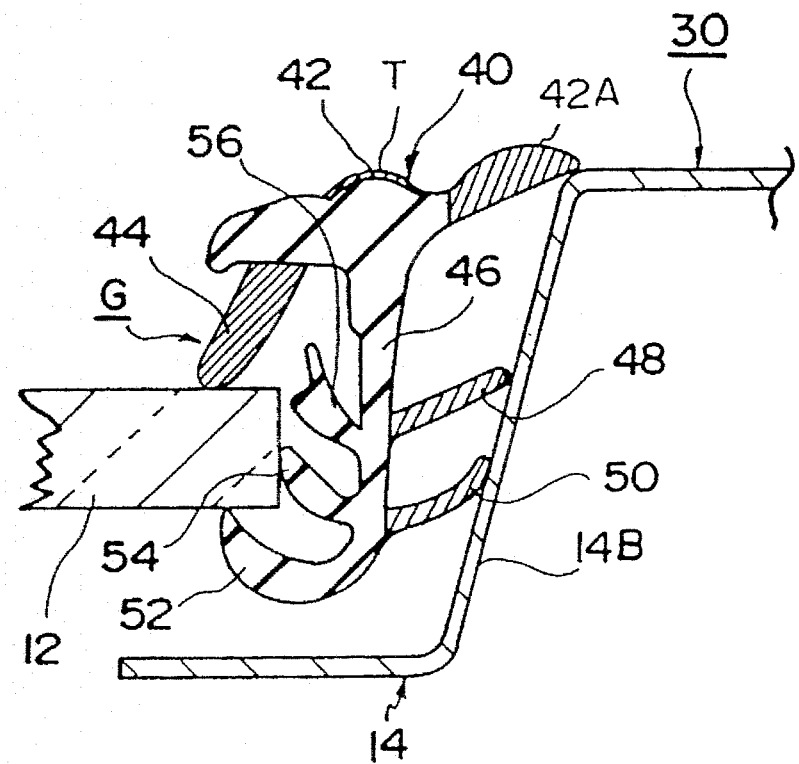
FIG. 7 is a sectional view along line 7—7 in FIG. 6.
Figure 8:
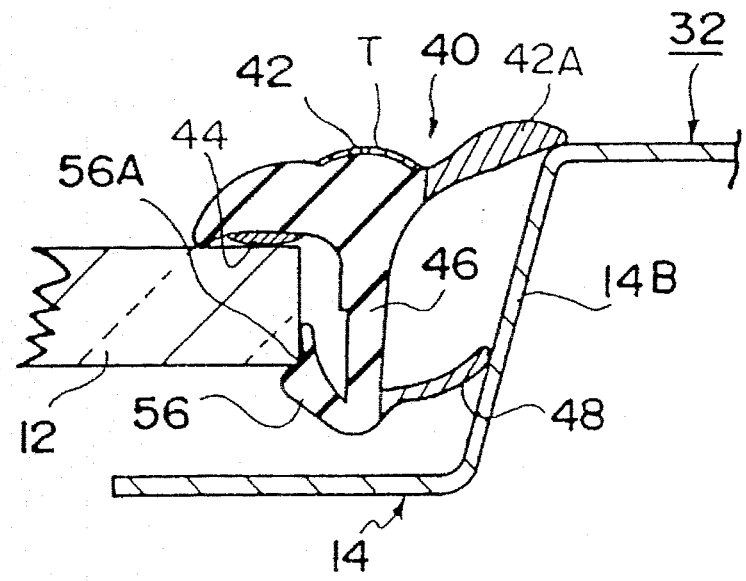
FIG. 8 is a sectional view along line 8—8 in FIG. 6.
Figure 9:
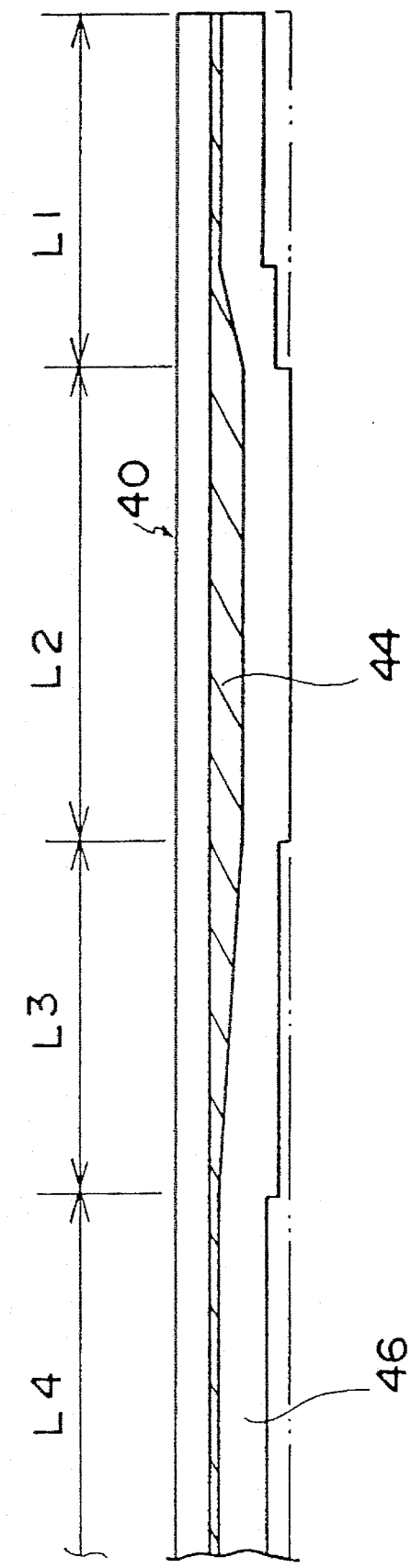
FIG. 9 is a partially unfolded view of the molding according to the second embodiment of the present invention.
Figure 10:
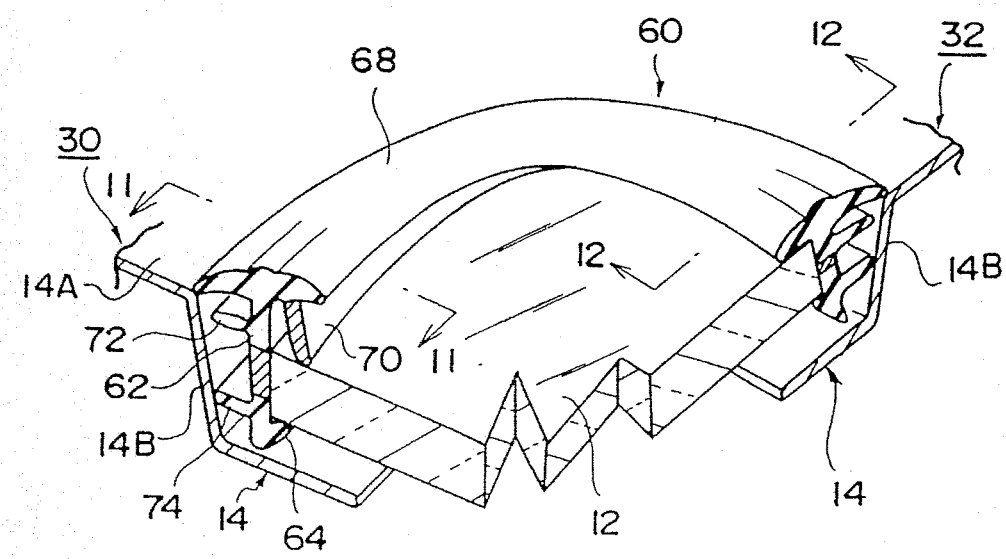
FIG. 10 is a perspective view illustrating a mounted state of a molding according to a third embodiment of the present invention.
Figure 11:
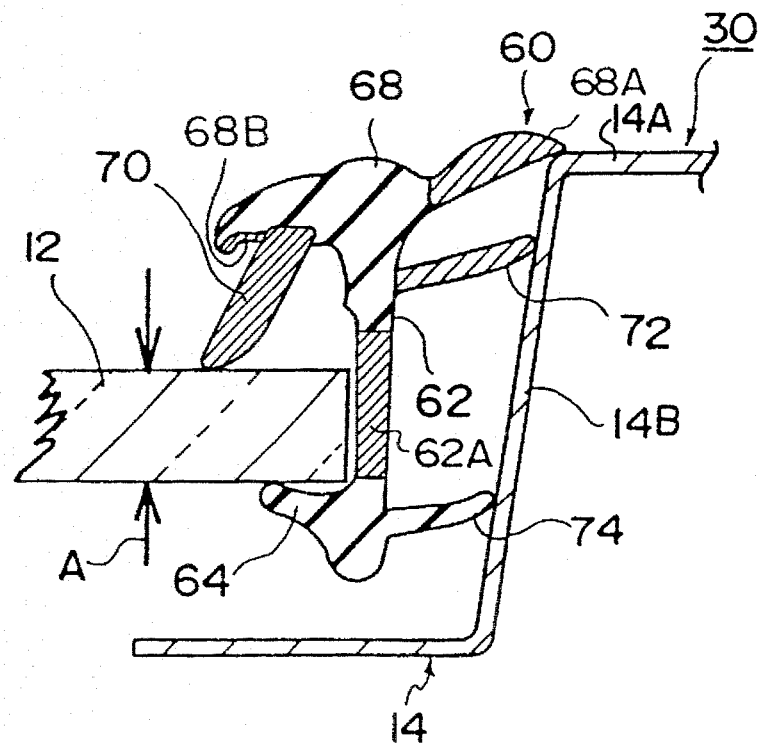
FIG. 11 is a sectional view along line 11—11 in FIG. 10.
Figure 12:
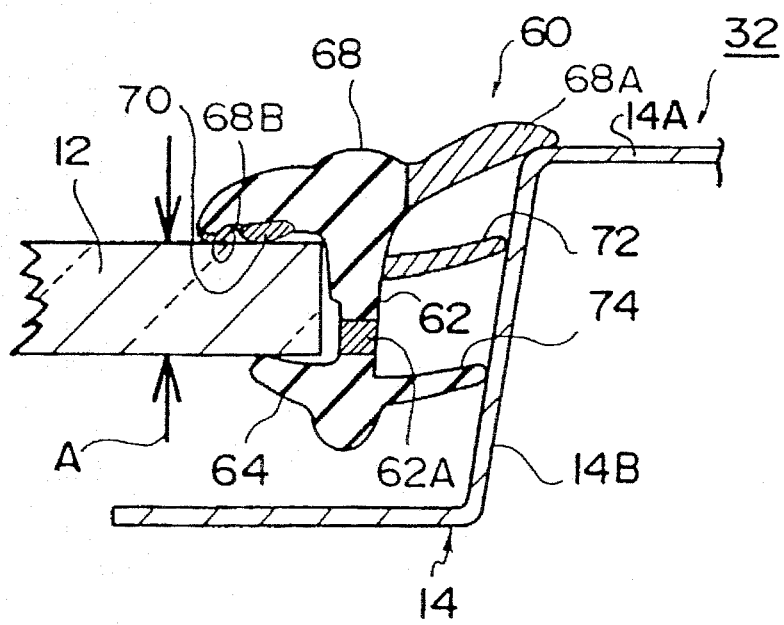
FIG. 12 is a sectional view along line 12—12 in FIG. 10.
Figure 13:
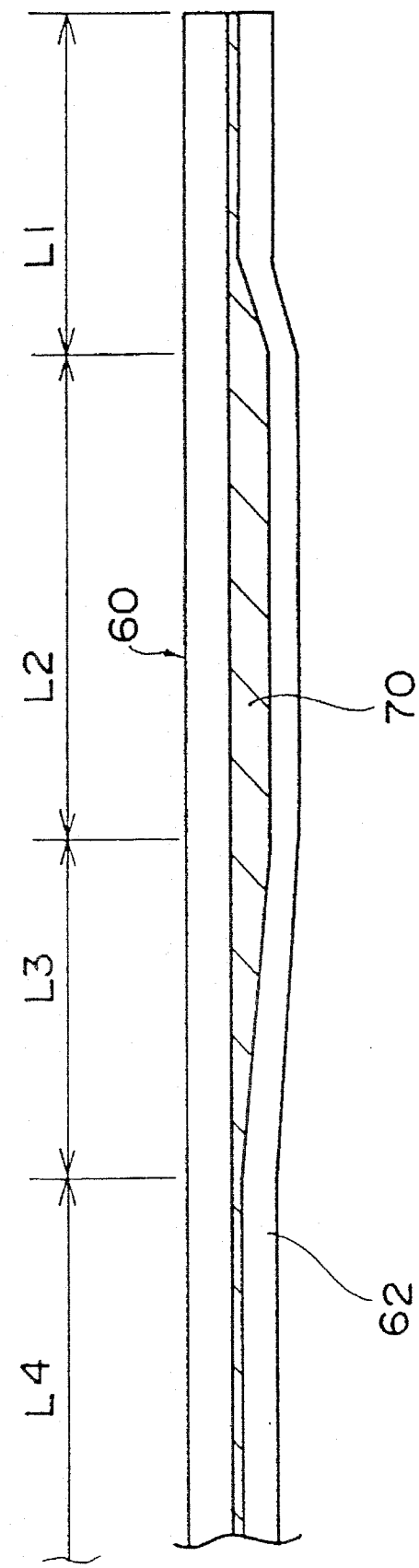
FIG. 13 is a partially unfolded view of the molding according to the third embodiment of the present invention.
Figure 14:
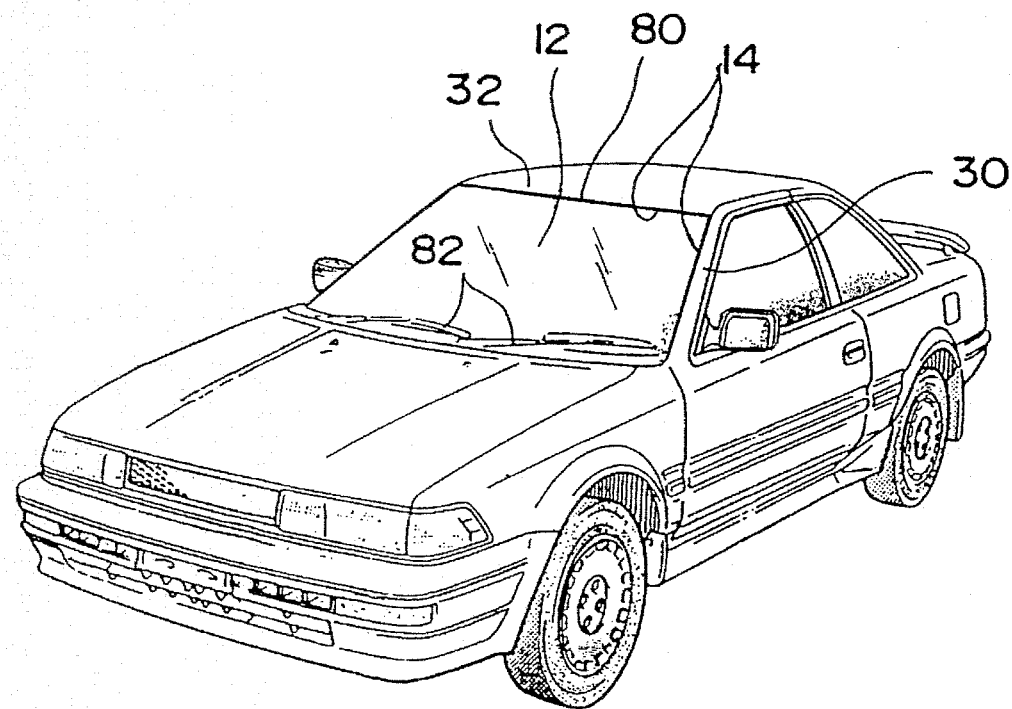
FIG. 14 is a schematic view illustrating a state in which the molding is mounted to a vehicle.
Figure 15:
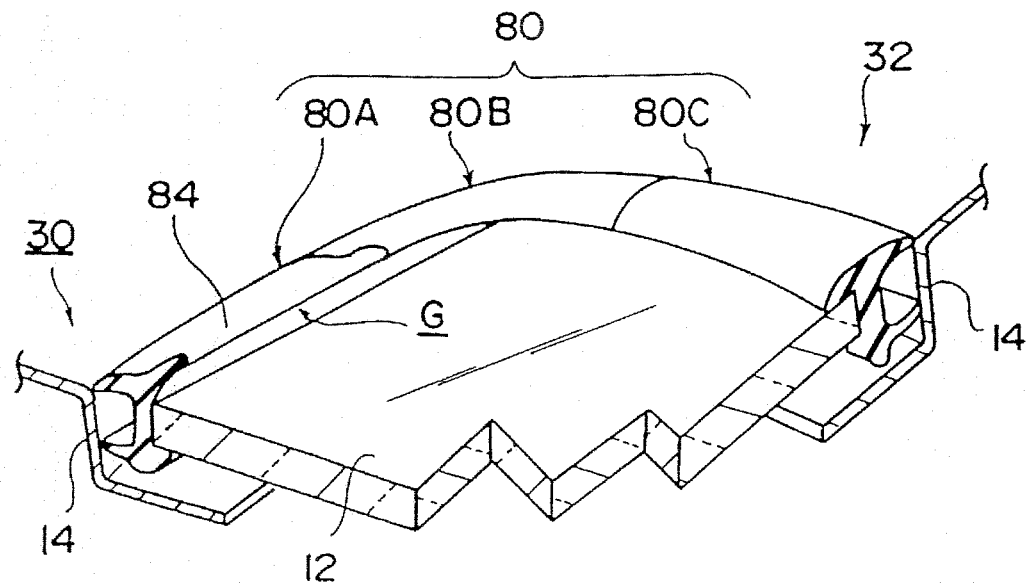
FIG. 15 is a perspective view illustrating a mounted state of a conventional molding.
Figure 16:
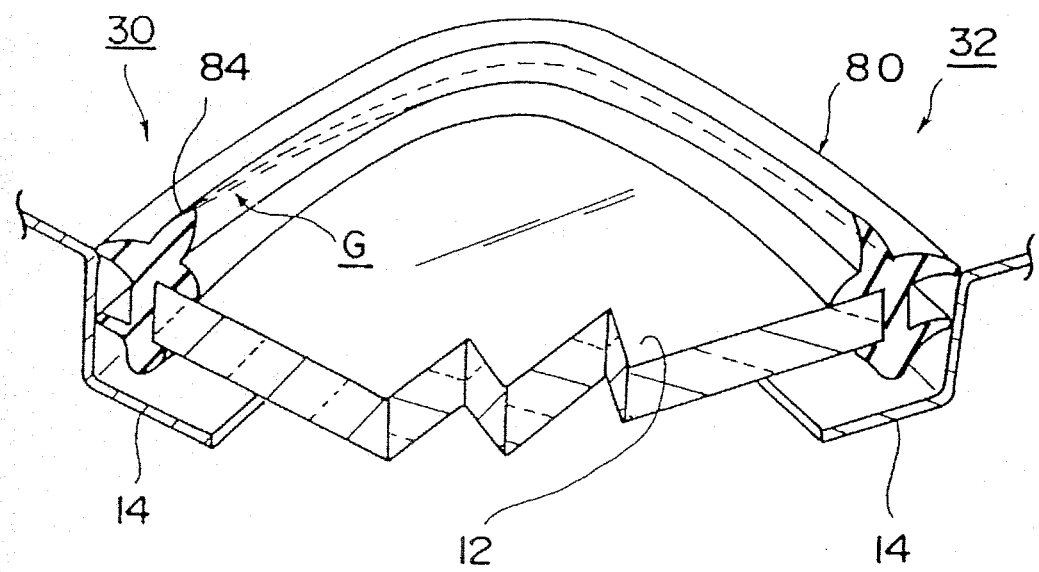
FIG. 16 is a perspective view illustrating a mounted state of another conventional molding.
Figure 17:
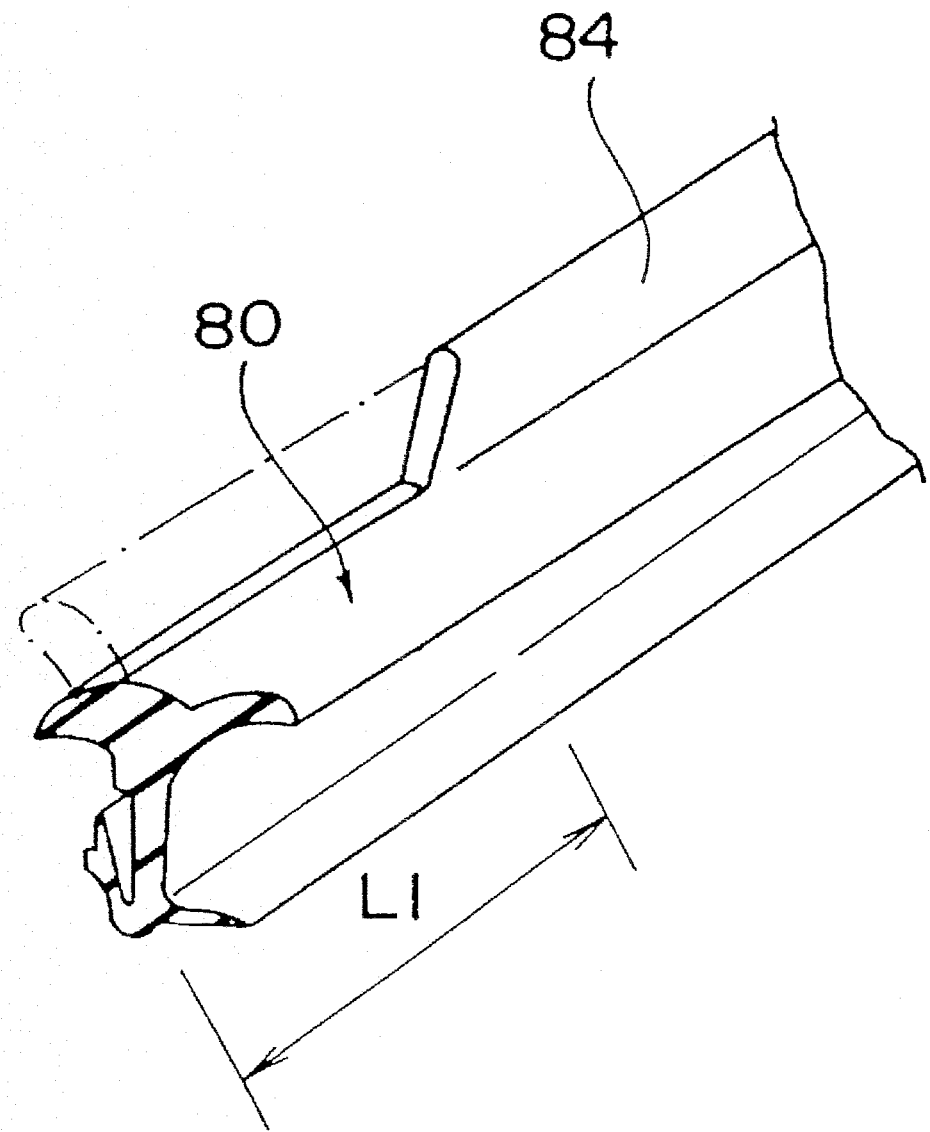
FIG. 17 is a perspective view illustrating an insertion portion of the conventional molding.

Further, at an intermediate portion of a leg portion 46 (which is formed of vinyl chloride having a Shore hardness of 95), a pair of panel lips 48 and 50 (respectively formed of a chlorinated ethylene copolymer crosslinked alloy having a Shore hardness of 70) are provided so as to project towards the window frame 14, and abut and engage an upright surface 14B of the window frame 14. Moreover, the peripheral portion of the front glass 12 is supported by three glass lips 52, 54 and 56 which are provided so as to project from the leg portion 46 towards the front glass 12 at the front pillar portion 30, as shown in FIG. 7. The glass lip 54 disposed at the central portion is crushed by the end surface of the front glass 12 at the front pillar portion 30. The peripheral portion of the front glass 12 is supported by the glass lips 52 and 56 disposed at respective sides of the glass lip 54. Moreover, the leg portion 46 is cut in a step-like manner, as shown in FIG. 9, so that the glass lip 56 and the panel lip 48 remain at the roof portion 32, as shown in FIG. 8. The peripheral portion of the front glass 12 is interposed between a step portion 56A formed at the tip of the glass lip 56 and the lower surface of the head portion 42.

Thus, although the molding 40 according to the second embodiment is to be cut at the roof portion 32, because cut portions do not appear on the outside surface, the appearance does not deteriorate. Moreover, since only the cross-section of the groove lip 44 is varied, the extrusion speed during molding can be kept constant and the other constituent portions are not adversely effected. Further, as in the first embodiment, since the portions having the varying cross-sections do not appear on the outside surface, the appearance improves without any changes to the design surface.

Next, the molding according to the third embodiment will be described.

A molding 60 of the third embodiment is formed by multicolor integral molding. As shown in FIGS. 10 to 13, a head to portion 68 has a parasol-shaped cross-section and extends to both sides from the upper end of a leg portion 62 (formed of vinyl chloride having a Shore hardness of 95), which is inserted into the gap between the peripheral portion of the front glass 12 and the window frame 14 of the body. A lower surface 68B of an inside lip shown by oblique lines is formed of a chlorinated ethylene copolymer crosslinked alloy having a Shore hardness of 70. An outside lip 68A shown by oblique lines (formed of a chlorinated ethylene copolymer crosslinked alloy having a Shore hardness of 70) is elastically supported on the upper surface 14A of the window frame 14 of the body.

Further, the peripheral portion of the front glass 12 is interposed between a glass lip 64, which is formed at the lower end of the leg portion 62, and the tip of a groove lip 70 (formed of a chlorinated ethylene copolymer crosslinked alloy), which is made of a soft material and which extends from the lower surface of the head portion 68 (formed of vinyl chloride having a Shore hardness of 95) towards the front glass 12.

A pair of panel lips 72 and 74 are provided so as to project respectively from upper and lower portions of the leg portion 62 towards the window frame 14 and are spaced apart by a predetermined interval. The panel lips 72, 74 abut and engage the upright surface 14B of the window frame 14. A varying portion 62A (shown by crossed lines) of the leg portion 62 located between the glass lips 72 and 74 is integrally molded with the leg portion 62, but is formed of a different material. The varying portion 62A becomes smaller as the groove lip 70 gradually changes (see FIG. 11 and FIG. 12) so that the inserted length of the leg portion 62 is shortened. Therefore, the amount A by which the front glass 12 is held by the groove lip 70 and the glass lip 64 does not change, whereby the adhesion of the molding 60 and the front glass 12 is improved.

What is claimed is:

1. A molding for mounting in a gap between an outer periphery of a front glass and a window frame of an automobile, comprising:

a section of material including a first pillar section extending into a first corner section, and a second pillar section extending into a second corner section, the corner sections being interconnected via a roof section, a cross-section of said section of material comprising (i) a leg portion having an upper end and first and second opposite sides, said leg portion being adapted to be received in a gap between an outer periphery of a front glass and a window frame of an automobile; (ii) a head portion extending from the upper end of the leg portion and overhanging the leg portion, said head portion being adapted to traverse the gap and including upper and lower surfaces; (iii) a glass lip projecting from the first side of the leg portion, whereby the molding is adapted to receive the outer periphery of the front glass between the glass lip and the lower surface of the head portion; (iv) a panel lip projecting from the second side of said leg portion, said panel lip being adapted to elastically abut and engage the window frame; and (v) a groove lip extending over a length of each of the pillar sections, said groove lip projecting from the upper surface of the head portion, wherein a height of the groove lip above the head portion becomes gradually shorter as said groove lip extends to the respective corner section, said leg portion, said head portion, said glass lip, said panel lip and said groove lip are integrally extrusion molded, and said groove lip is comprised of a material that is different from the respective materials of the leg portion, the head portion, the glass lip and the panel lip.

2. The molding of claim 1, wherein said section of material further includes first and second insertion sections respectively extending from the first and second pillar sections opposite the corner sections, wherein a height of said groove lip is reduced along the insertion sections.

3. The molding of claim 1, wherein said groove lip comprises a soft material.

4. The molding of claim 3, wherein said soft material has a Shore hardness of approximately 80.

5. The molding of claim 1, wherein said head portion has a parasol-shaped cross-section and includes an inside lip and an outside lip.

6. The molding of claim 5, wherein said outside lip and said panel lip are comprised of a material that is different from the material of said groove lip.

7. The molding of claim 5, wherein said inside lip includes a main body portion and a lower surface portion, said lower surface portion providing said lower surface of the head portion, said lower surface portion comprising a material that is different than the material of said main body portion.

8. The molding of claim 7, wherein said lower surface portion comprises a material having a Shore hardness of approximately 70.

9. The molding of claim 5, wherein said outside and inside lips are comprised of different materials.

10. The molding of claim 9, wherein said outside lip comprises a material having a Shore hardness of approximately 70.

11. The molding of claim 11, wherein said leg portion and said glass lip are comprised of the same material.

12. The molding of claim 11, wherein the material of said leg portion and said glass lip has a Shore hardness of approximately 95.

13. The molding of claim 1, wherein said panel lip is comprised of a material having a Shore hardness of approximately 70.

* * * * *